US012789122B2

(12) United States Patent
Egger et al.

(10) Patent No.: US 12,789,122 B2
(45) Date of Patent: Nov. 10, 2026

(54) FILTER SECTOR FOR A FILTER DISC AND DISC FILTER WITH A FILTER SECTOR

(71) Applicant: Andritz AG, Graz (AT)

(72) Inventors: Markus Egger, Graz (AT); Wolfgang Magor, Kumberg (AT); Daniel Stelzer, Veitsch Graz (AT); Erwin Buchberger, Bad Blumau (AT)

(73) Assignee: ANDRITZ AG, Graz (AT)

( * ) Notice: Subject to any disclaimer, the term of this patent is extended or adjusted under 35 U.S.C. 154(b) by 377 days.

(21) Appl. No.: 18/264,155

(22) PCT Filed: Dec. 14, 2021

(86) PCT No.: PCT/EP2021/085704
§ 371 (c)(1),
(2) Date: Aug. 3, 2023

(87) PCT Pub. No.: WO2022/179738
PCT Pub. Date: Sep. 1, 2022

(65) Prior Publication Data

US 2024/0091684 A1 Mar. 21, 2024

(30) Foreign Application Priority Data

Feb. 26, 2021 (AT) .............................. A 50133/2021

(51) Int. Cl.
*B01D 33/23* (2006.01)
*D21D 5/16* (2006.01)

(52) U.S. Cl.
CPC ............... *B01D 33/23* (2013.01); *D21D 5/16* (2013.01)

(58) Field of Classification Search
CPC ........... B01D 33/23; D21D 5/16; D21D 5/046
See application file for complete search history.

(56) References Cited

U.S. PATENT DOCUMENTS 5,028,474 A * 7/1991 Czaplicki ................ B32B 27/06 428/184
10,894,226 B2 1/2021 Niggl et al.
2006/0261001 A1 11/2006 Hagg
2019/0217227 A1* 7/2019 Niggl ..................... B01D 33/23

FOREIGN PATENT DOCUMENTS

CN 1742133 A * 3/2006 ............. B01D 33/23
CN 103721460 A * 4/2014
DE 102017107665 A1 10/2018
EP 0693008 B1 * 12/1997 ............. B29C 49/48
EP 3664910 B1 7/2021
SE 528029 C2 8/2006

OTHER PUBLICATIONS

International Search Report mailed Feb. 16, 2022 for International Patent Application No. PCT/EP2021/085704.
International Preliminary Report on Patentability dated Jul. 5, 2022 for International Patent Application No. PCT/EP2021/085704.

* cited by examiner

*Primary Examiner* — Waqaas Ali
(74) *Attorney, Agent, or Firm* — Alix, Yale & Ristas, LLP

(57) ABSTRACT

A filter sector for a filter disc or a disc filter with a perforated and structured filter plate, wherein the filter plate can be suctioned. The filter plate comprises at least one arch structure with a polygonal base. An improvement in the separation capacity or separation efficiency is made possible.

19 Claims, 6 Drawing Sheets

FILTER SECTOR FOR A FILTER DISC AND DISC FILTER WITH A FILTER SECTOR

BACKGROUND

The disclosed embodiments relate to a filter sector for a rotating filter disc of a disc filter comprising at least one perforated and structured filter plate and an interior space of the filter sector, wherein the filter plate can be suctioned via the interior space of the filter sector for separating liquid from a suspension. Embodiments of a disc filter with a filter sector like that described above is also disclosed herein.

Disc filters are used to separate liquid from a suspension and in the field of pulp and paper production. In the latter field of application, disc filters also allow the recovery of fibrous material from fibre suspensions in particular.

Typically, several filter sectors form a filter disc, whereby the filter disc in the disc filter is designed to rotate. As a rule, the filter disc or the filter sectors are connected to a hollow shaft, whereby the filter sectors can be suctioned via the hollow shaft. As a result of the suction of the filter sectors, liquid is sucked out of the suspension into the interior space of the filter sector and solid material, for example fibrous material, is deposited on the filter plates, forming a filter cake on the filter plate. The filter cake is removed from the filter sector at a suitable point in the disc filter, for example by scrapers, so that the filter sector is ready for a new filtration process. In general, an attempt is made to design the filter sectors in such a way that the greatest possible separation efficiency of the filter sector or the greatest possible efficiency of the disc filter is achieved. At the same time, the filter sectors are mechanically loaded components with corresponding requirements in terms of rigidity, whereby the filter sectors in turn cause a mechanical load on the hollow shaft.

For example, DE 10 2017 118050 A1 discloses a filter sector for a disc filter, wherein the filter sector comprises perforated filter plates provided with a wave profile and the wave profile has a specific arrangement of valleys and ridges. The wave profile increases the surface area available for dewatering and thus improves the efficiency of the disc filter.

It should be noted that, in accordance with the state of the art, an increase in the surface area of the filter plate often also means an increase in the mass of the filter sector, and filter discs with larger masses also mean greater mechanical loads on the hollow shaft. Especially in the case of retro-fitting existing disc filters, the hollow shaft remains unchanged, but the retrofitted, heavier filter sectors can then lead to a failure of the hollow shaft in the medium or long-term.

US2006261001A1 further discloses a filter sector for a rotating filter disc, wherein a filtrate chamber is formed between a first rigid mesh and a second rigid mesh, the rigid meshes forming profiled filtration walls and having cavities and peaks, each cavity and peak being formed from a large number of meshes of the mesh. Advantageously, special weaving techniques are used to form the cavities and peaks.

U.S. Ser. No. 10/894,226B2 in turn discloses a filter element of a rotary disc filter comprising two filter plates which are perforated and profiled, wherein at least one filter plate has a waved cross-section and each outer side of the filter plates has protrusions whose cross-section is round or elongated.

Finally, DE102017107665A1 discloses filter discs for a disc filter, wherein circular sector-shaped filter sectors are formed with filter plates having a large number of perforation openings. In particular, a filter sector formed from a wavy profiled sheet with flat filter plates and circular recesses is disclosed.

SUMMARY

Disclosed herein is a filter sector for a disc filter which allows an increase in the separation performance or an increased efficiency of the disc filter. The disclosed embodiments provide an increase in efficiency while at the same time reducing the amount of material used for the filter sector. And finally, the filter sectors exhibit improved separation behaviour of the filter cake, or fibre mat, respectively.

According to the disclosure, this is achieved by the filter plate comprising at least one arch structure with a polygonal base. Polygonal base means an essentially plane geometric figure formed by a closed sequence of sections. Accordingly, arch structure means a shell formed over this base. The term shell refers to a body that is arched and whose thickness is less than its other dimensions. Preferably, the shell is arched and free of edges. Free of edges refers to the shape of the shell. Since the arch structure is perforated in itself, edges naturally appear at the perforations, which are irrelevant to the shape of the shell. The design of the filter plate with arch structures disclosed herein has a positive effect on the separation efficiency, since the filter plate forms an enlarged surface area via the arch structure and the enlarged surface area allows for an immediate increase in efficiency. Surprisingly, it was found that the formation of the filter plate with an arch structure with a polygonal base has a positive effect on the strength of the filter plate, whereby sufficient filter plate strength or stiffness values can be achieved even when using less material on the filter plate. In this way, the filter plate and thus the filter sector can be produced with less weight. The simultaneous increase in the surface area of the filter plate, results in an unexpected synergistic effect. Advantageously, a filter plate according to the disclosure comprises a large number of the arch structures. Equally advantageously, the structuring of the filter plate can vary, at least in sections. In the disclosed preferred embodiment, the polygonal base of the arch structure is a hexagon.

An advantageous embodiment of the filter sector is characterised in that the polygonal base of the arch structure is an equilateral hexagon. By designing the base of the arch structures as a hexagon and in particular as an equilateral hexagon, the advantages according to the invention are particularly pronounced. In addition to increasing the surface area of the filter plates through the arch structures, the use of a hexagonal base is particularly advantageous in terms of improved strength or stiffness of the filter plate, which can further reduce the amount of material used. The synergistic effect, i.e. the increase in the efficiency of the filter sector and at the same time the reduced material input with the same strength or stiffness, is particularly pronounced. Optionally, the base, which is designed as a hexagon with six sections, can be designed as saddle surfaces on two opposing sections and can be designed in the form of two opposing ridge surfaces on the other four sections, whereby two sections in each case form a ridge surface and the ridge surfaces are connected by the saddle surfaces. Thus, the four further sections of the base lie substantially in one plane, with a respective pass of the saddle surface located between the plane and the interior space. This design of the arch structure with saddle surfaces on two opposite sections of the base has a further positive effect on the strength or stiffness of the filter plate. A flow of a liquid in the interior space of the filter sector then also preferably takes place in the direction of the ridge surfaces.

Another advantageous embodiment of the filter sector is characterised in that the arch structure is oriented to the interior space of the filter sector and is thus convex when viewed from the interior space in the direction of the filter plate. In this case, the filter sector comprises an interior space which is at least delimited by the surrounding filter plates. When the interior space is connected to a source of vacuum, liquid is drawn in through the filter plates from the suspension surrounding the filter sector, forming a filter cake, e.g. a fibre mat, on the surface area of the filter plates. Advantageously, the arch structures have a height of up to 25 mm, preferably up to 10 mm, above the base. Unexpectedly, this has a positive effect on the separation or roll-off behaviour of the filter cake or fibre mat from the filter sector. In the case of filter plates designed with a wave profile, for example, the orientation of the wave profile can make the separation of the filter cake more difficult, as the orientation of the wave and the roll direction diverge during the unrolling of the filter cake or fibre mat, which hinders the unrolling process. On the other hand, a filter sector with the advantageous arch structures does not form a preferred direction and has a quasi-isotropic effect, which also means that there is no divergence from a rolling direction of the filter cake or the fibre mat.

An equally favourable embodiment of the filter sector is characterised in that the filter plate has perforations with a hydraulic diameter of 0.2 mm to 3 mm, preferably 0.4 mm to 0.8 mm and for example 0.6 mm. This ensures a good ratio of permeation and retention. Typically, circular bores are used, in which case the hydraulic diameter and the circular diameter correspond. However, other geometries (oval, slotted, etc.) with the above hydraulic diameters for the perforations are also possible, whereby the hydraulic diameter is defined as the quotient of four times the area of the perforation and the circumference of the perforation. It is also advantageous to design the filter plate with an open area of 10% to 40%, in particular 15% to 30%.

An advantageous design of the filter sector is characterised in that a section of the polygonal base of a first arch structure is also formed as a section of the polygonal base of a second arch structure. Advantageously, a filter plate comprises a large number of arch structures, wherein the individual arch structures are directly adjacent to each other. This means that a section of the polygonal base of a first arch structure is also a section of the polygonal base of a second adjacent arch structure. In this way, a dense arrangement of the arch structures can be achieved, enabling a large surface area of the filter plate. In addition, a dense arrangement also has a positive effect on the strength or stiffness of the structure.

A particularly advantageous embodiment of the filter sector is characterised in that the polygonal base of a first arch structure is formed from sections, wherein each section of the polygonal base of the first arch structure is also formed as a section of the polygonal base of the arch structures surrounding the first arch structure. In this particularly dense arrangement of arch structures, a first arch structure is surrounded by another adjacent arch structure on each section or side of the polygonal base. This allows for a large surface area of the filter plate, with advantageous strength or stiffness of the structure.

A further advantageous embodiment of the filter sector is characterised in that the perforated and structured filter plate is an arch-structured perforated plate. The process of arch-structuring is disclosed, for example, in EP 0693 008 A1. A perforated sheet formed in this way allows the realisation of an advantageous arch structure, e.g. with a base formed as a hexagon and in particular as an equilateral hexagon. Likewise, perforated sheets formed in this way have very advantageous strength or stiffness properties and allow filter sectors to be provided with little material input.

In a favourable embodiment, the filter sector is shaped like a circular sector. Typically, several filter sectors form a filter disc of a disc filter. The circular sector design allows an especially simple assembly of the filter disc out of several filter sectors.

In a particularly advantageous design, the filter sector is attached to the circumference of a hollow shaft. The filter plates extend essentially in the radial direction and circumferential direction of the hollow shaft. On both sides of the inner space of the filter sector, filter plates are arranged opposite each other, whereby the arch structures of the opposite filter plates are either arranged symmetrically to the inner space or are arranged offset to each other by half a base in radial direction to the hollow shaft. As already explained, the filter sector comprises an inner space that is delimited by the surrounding filter plates. When the opposing filter plates are arranged symmetrically to the interior space, the filter plates can be arranged contacting each other, for example, with opposing arched surfaces touching each other. At the contact points of the arched surfaces, the opposing filter plates can be joined by spot welding, for example, and the strength of the filter sector can thus be increased. With a staggered arrangement of the opposing filter plates, with an offset of half a base in radial direction to the hollow shaft, mutual contact of the filter plates can be avoided. In this way, flow obstacles are avoided in the interior space, which is advantageous for the separation performance of the filter sector or the efficiency of the disc filter.

The disclosed embodiments also relate to a disc filter with a rotating hollow shaft and at least one filter disc, wherein the filter disc comprises several of the disclosed filter sectors. The filter sectors extend essentially in the radial direction and circumferential direction of the hollow shaft. Furthermore, the filter sectors are arranged on the circumference of the hollow shaft and can be suctioned via the hollow shaft, whereby the liquid separated from a suspension can be fed from the interior space of the filter sector essentially in a radial direction of the hollow shaft. The radial direction is to be understood as the radial direction of the hollow shaft. Disc filters with the disclosed filter sectors have an advantageous separation performance or increased efficiency, whereby this is possible while at the same time reducing the amount of material used.

Another advantageous embodiment of the disc filter is characterised in that the filter plate comprises a large number of adjacent arch structures, the base of the arch structures being a hexagon and in particular an equilateral hexagon, the filter plate being aligned with the hollow shaft such that a line connecting the centres of opposite portions of the base points substantially towards the hollow shaft. A filter plate aligned in such a way with adjoining arch structures allows the liquid to be guided advantageously from the interior space of the filter sector in the direction of the hollow shaft, whereby the most direct possible guidance of the liquid is provided.

BRIEF DESCRIPTION OF THE DRAWINGS

The invention will now be described using the examples in the drawings.

DETAILED DESCRIPTION

Figure 1:
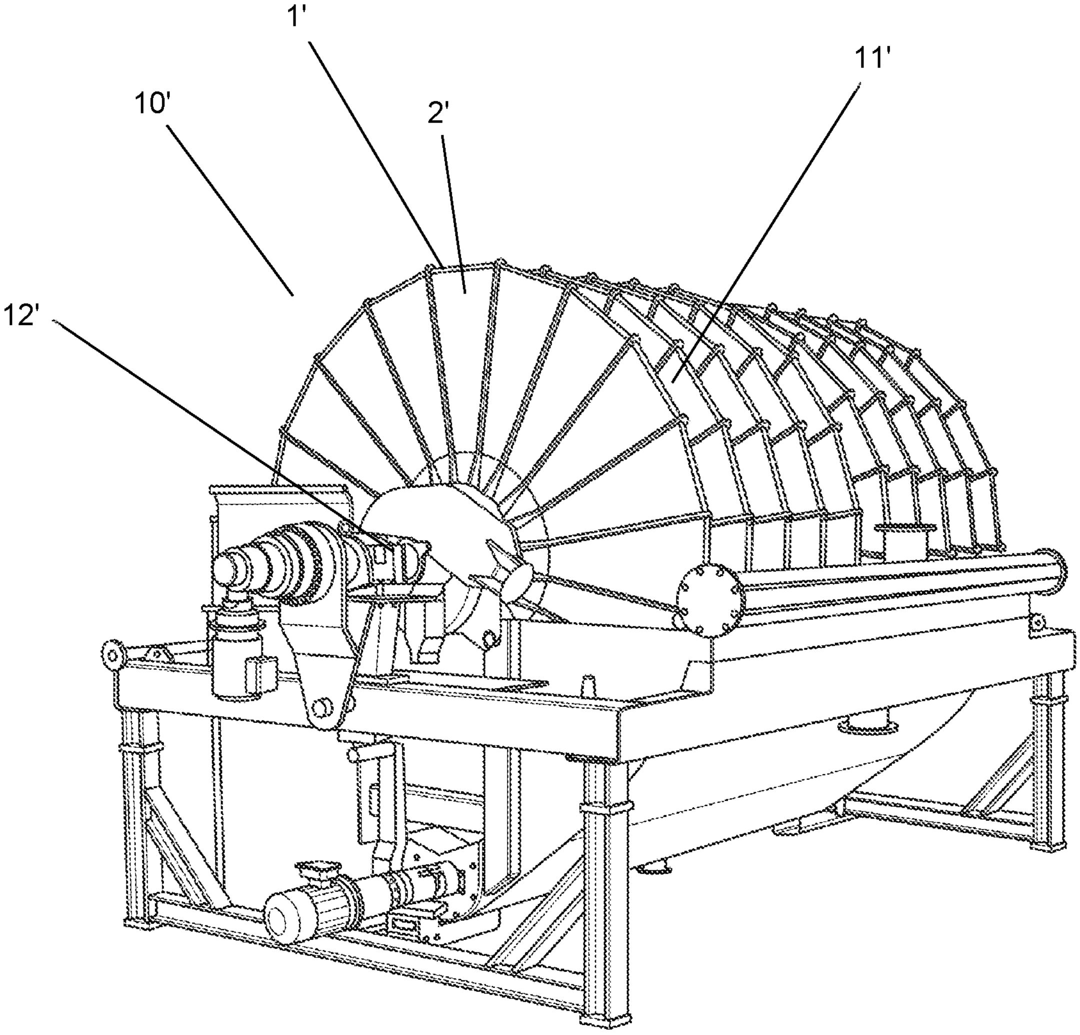
Fig. 1 PRIOR ART
FIG. 1 shows a disc filter according to the state of the art.

FIG. 1 shows a disc filter according to the state of the art. In this case, several filter sectors 1' form a filter disc 11', whereby the filter discs 11' are at least partially immersed in a suspension. The filter sectors 1' are attached to the circumference of a hollow shaft 12' and extend substantially in a radial direction and circumferential direction of the hollow shaft 12'. The filter sectors 1' can further be suctioned via the hollow shaft 12', whereby liquid can be separated from the suspension surrounding the filter sectors 1' through the filter plates 2' into the respective interior space 13' of the filter sectors 1'. According to the suction of the filter sectors 1' via the hollow shaft 12', the separated liquid is fed to the hollow shaft.

Figure 2:
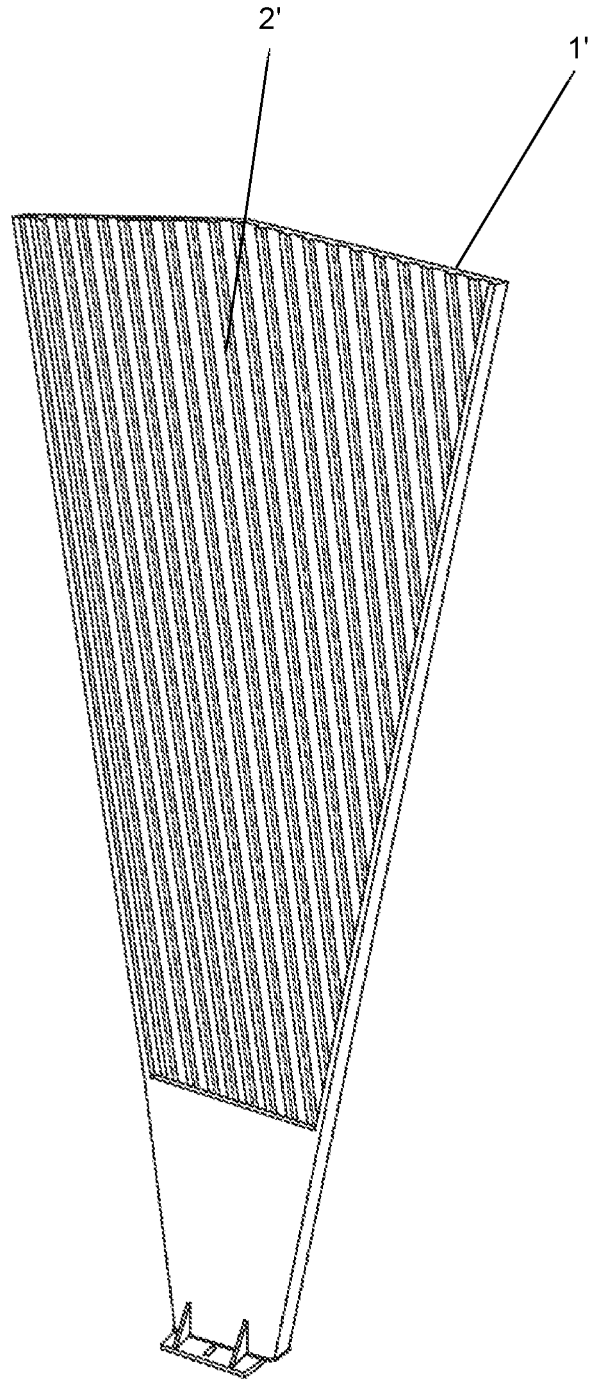
Fig. 2 PRIOR ART
FIG. 2 shows a filter sector with a structured filter plate according to the state of the art.

FIG. 2 shows a filter sector 1' with a perforated and structured filter plate 2' according to the state of the art. In this case, the filter plate 2' has a wave profile, whereby the wave profile has valleys and ridges.

Figure 3:
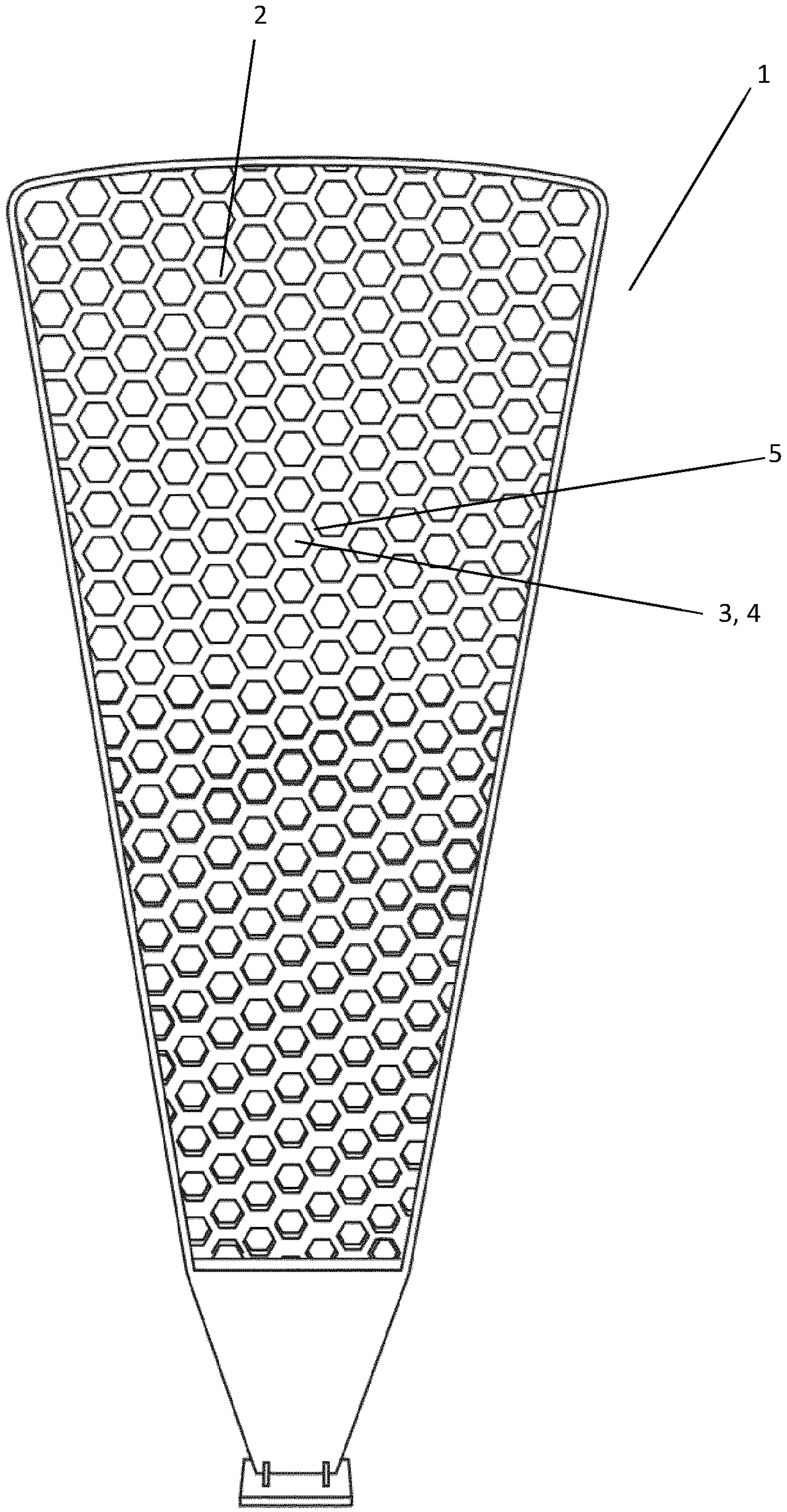
FIG. 3 shows an advantageous design of a filter sector.

FIG. 3 shows an advantageous design of a filter sector 1. The filter sector 1 comprises a perforated and structured filter plate 2, wherein the interior space 13 of the filter sector 1 is at least delimited by the surrounding filter plates 2. As disclosed herein, the filter plate comprises at least one arch structure 3 with a polygonal base 4. Advantageously, the polygonal base 4 of the arch structure 3 is formed as a hexagon and in particular as an equilateral hexagon, whereby the arch structures 3 are oriented to the interior space 13 of the filter sector 1. Advantageously, the arch structures 3 are arranged adjacent to each other, wherein each section 5 of the polygonal base 4 of a first arch structure 3 is also formed as a section of the polygonal base 4 of the arch structures 3 surrounding the first arch structure 3.

Figure 4:
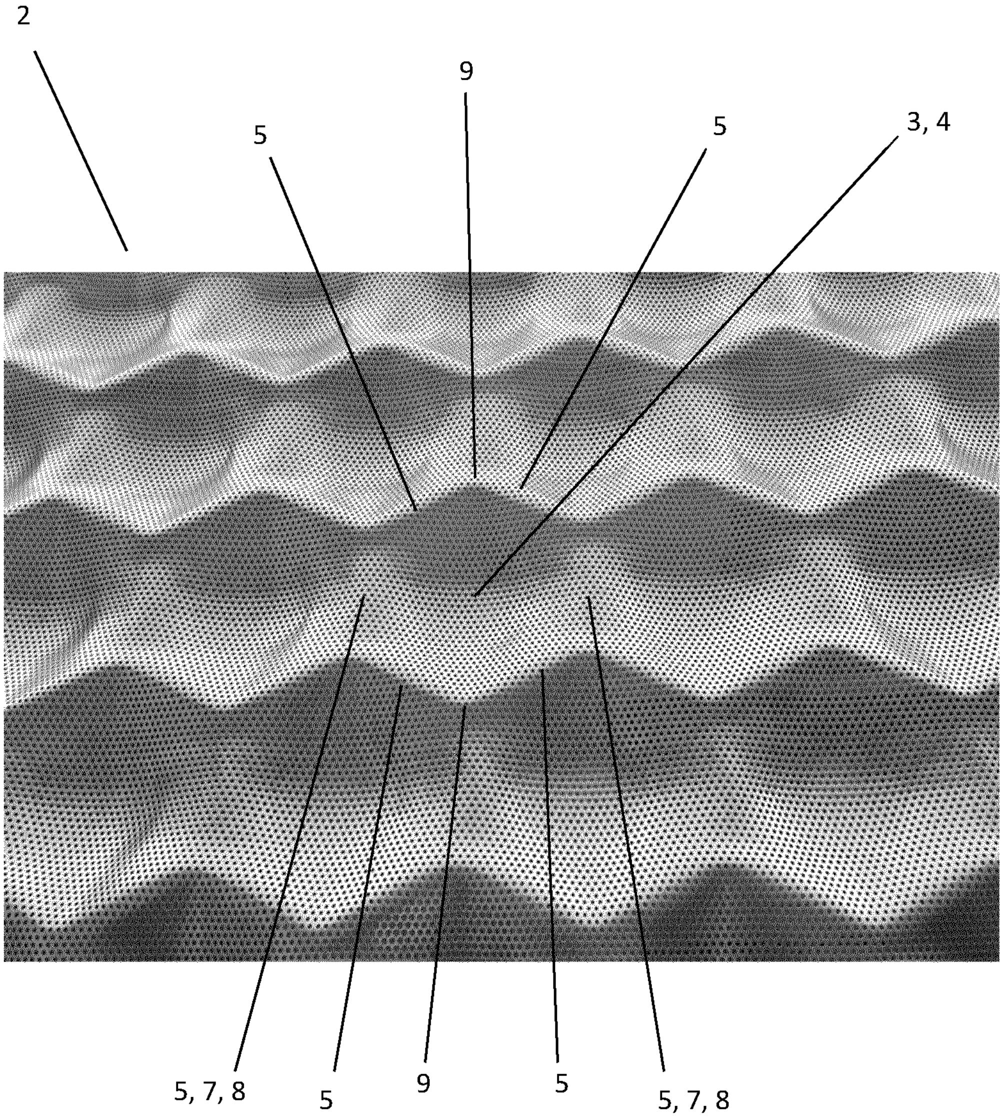
FIG. 4 and FIG. 5 show a filter plate with advantageous arch structures.
Figure 5:
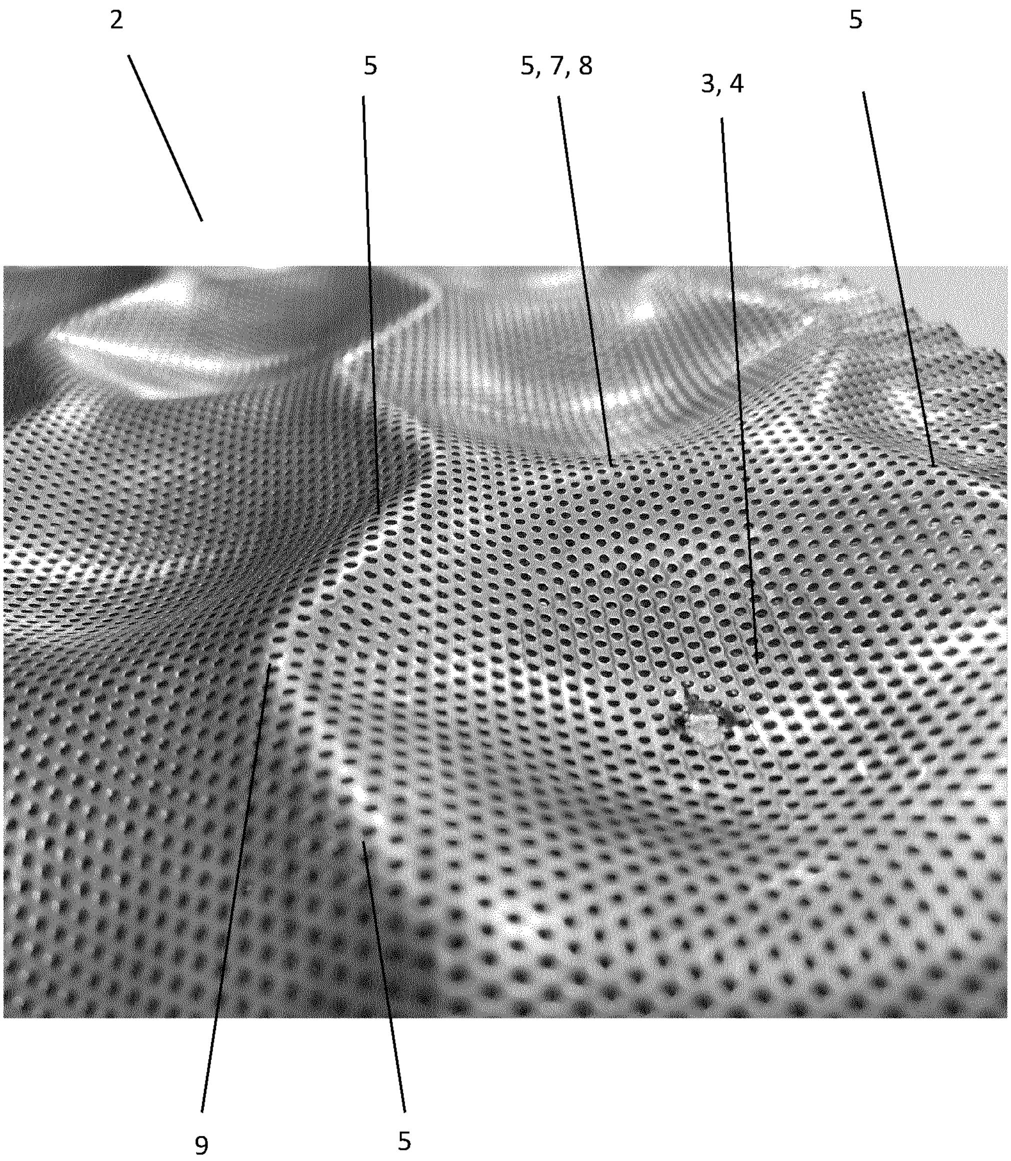

FIG. 4 and FIG. 5 show a filter plate 2 with advantageous arch structures 3. The arch structure 3 comprises a polygonal base 4, wherein the polygonal base 4 is an equilateral hexagon. Advantageously, the arch structure 3 is formed with a height 6 of up to 25 mm, preferably up to 10 mm, above the base 4, the filter plate 2 having perforations with a hydraulic diameter of 0.2 mm to 3 mm, preferably 0.4 mm to 0.8 mm and for example 0.6 mm. In FIG. 4 and FIG. 5 the arch structures 3 are arranged adjacent to each other, whereby each section 5 of the polygonal base 4 of a first arch structure 3 is also formed as a section of the polygonal base 4 of the arch structures 3 surrounding the first arch structure 3. Advantageously, the individual arch structures are designed in such a way that two opposing sections 5 are formed as saddle surfaces 7 and the other four sections 5 form two opposing ridge surfaces 9, whereby two sections 5 each form a ridge surface 9 and the ridge surfaces 9 are connected by the saddle surfaces 7. In this case, the further four sections 5 of the polygonal base 4 lie essentially in one plane and a respective pass 8 of the saddle surface 7 is arranged between this plane and the interior space 13.

Figure 6A:
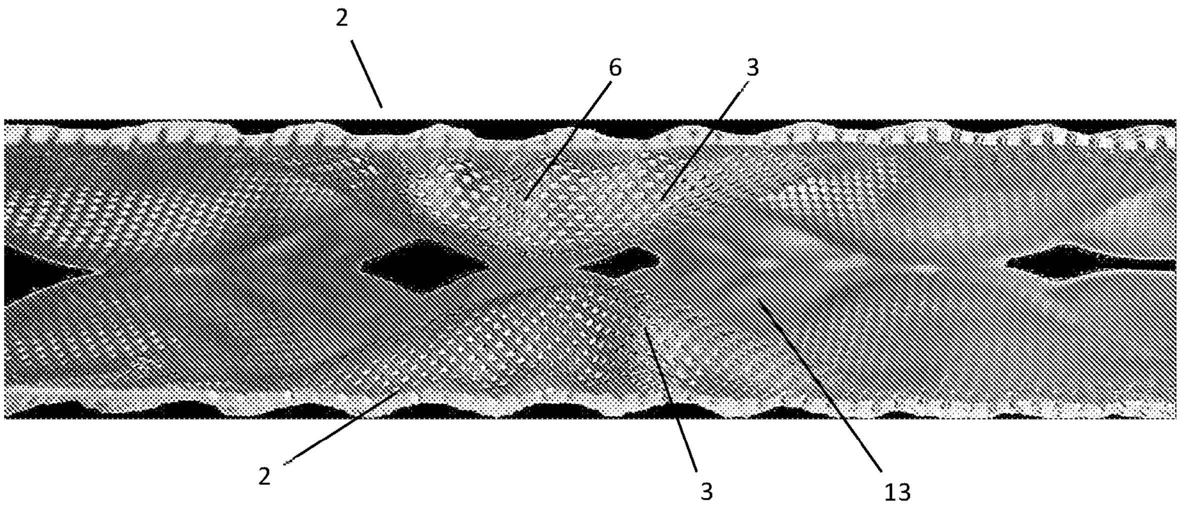
FIG. 6A and FIG. 6B show two filter plates arranged opposite each other with advantageous arch structures.
Figure 6B:
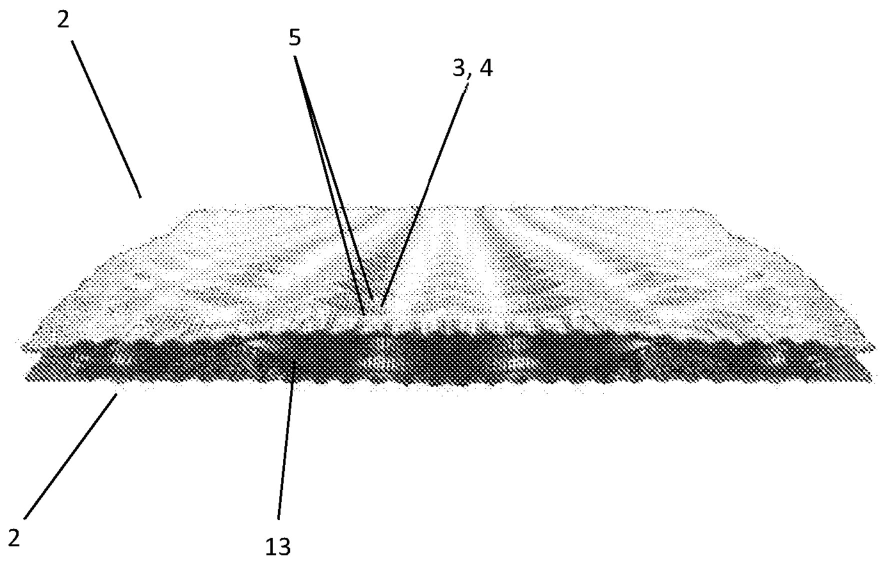

FIG. 6A and FIG. 6B show two filter plates 2 of a filter sector 1 arranged opposite each other. The filter plates 2 have the advantageous arch structures 3. In FIG. 6A, the viewing direction is parallel to the filter plates. Thus, the interior space 13 of the filter sector 1 is clearly visible, as is the height 6 formed by the arch structures 3 above the respective base 4. FIG. 6B is a top view of a section of the filter sector 1, showing the opposing filter plates 2 and the interior space 13. The opposing filter plates 2 are arranged on both sides of the interior space 13. In this case, the arch structures 3 of the opposing filter plates 2 are arranged symmetrically to the interior space 13 and the arch structures 3 of the opposing filter plates 2 are arranged mirrored opposite each other. An advantageous disc filter (not shown) comprises a filter sector, wherein the filter plate 2 is aligned with a hollow shaft 12 (not shown) such that a connecting line of the centres of opposing sections 5 of the base 4 of the arch structures 3 substantially points to the hollow shaft 12. Furthermore, the opposing filter plates 2 can be arranged symmetrically or mirrored to the interior space 13, whereby in a particularly advantageous arrangement the filter plates 2 are offset by half a base 4 in the radial direction to the hollow shaft 12.

The disclosed embodiments offer numerous advantages. This makes it possible to increase the surface area of the filter plates while at the same time improving the strength or stiffness of the filter plate. This allows improved separation or efficiency of the filter sector, whereby the material input at the filter sector can be reduced. Likewise, the inventive embodiments allow for improved separation or roll-off behaviour of the filter cake from the filter sector.

REFERENCE NUMERALS (1) Filter sector
(2) Filter plate
(3) Arch structure
(4) Polygonal base
(5) Section
(6) Height
(7) Saddle surface
(8) Pass
(9) Ridge surface
(10) Disc filter
(11) Filter disc
(12) Hollow shaft
(13) Interior space

The invention claimed is:

1. A filter sector (1) for a rotating filter disc (11) of a disc filter (10), the filter sector (1) having an interior space (13), comprising at least one perforated and structured filter plate (2), and an interior space (13) defined within the filter sector (1), wherein the filter plate (2) is configured to be suctioned via the interior space (13) of the filter sector (1) for separating liquid from a suspension, the filter plate (2) comprises at least one arch structure (3) with a polygonal base (4), the polygonal base (4) of the arch structure (3) being a hexagon, and the arch structure is formed as a shell over the base, the shell being free of edges.

2. The filter sector (1) according to claim 1, wherein the polygonal base (4) of the arch structure (3) is an equilateral hexagon.

3. The filter sector (1) according to claim 1, wherein the arch structure (3) is oriented into the interior space (13) of the filter sector (1) and is thus convex when viewed from the interior space (13) in the direction of the filter plate (2).

4. The filter sector (1) according to claim 1, wherein the arch structure (3) forms a height (6) of up to 25 mm above the base.

5. The filter sector according to claim 4, wherein the arch structure (3) forms a height (6) of up to 10 mm above the base (4).

6. The filter sector (1) according to claim 1, wherein the filter plate (2) has perforations with a hydraulic diameter within an approximate range of 0.2 mm to 3 mm.

7. The filter sector (1) according to claim 6, wherein the filter plate (2) has perforations with a hydraulic diameter within an approximate range of 0.4 mm to 0.8 mm.

8. The filter sector (1) according to claim 1, wherein the polygonal base (4) of a first arch structure (3) has a section (5) that is simultaneously formed as a section (5) of the polygonal base (4) of a second arch structure (3).

9. The filter sector (1) according to claim 1, wherein the polygonal base (4) of a first arch structure (3) is formed from sections (5) with each section (5) also being formed as a section of the polygonal base (4) of the arch structures (3) surrounding the first arch structure (3).

10. The filter sector (1) according to claim 1, wherein the hexagon is formed from six sections (5) with a first section (5) and a second section (5) being mutually opposite sections from each other and formed as saddle surfaces (7), a third section (5) and a fourth section (5) forming a first ridge surface (9), a fifth section (5) and a sixth section (5) forming a second ridge surface (9) mutually opposite from the first ridge surface (9), and the respective ridge surfaces (9) being connected by the saddle surfaces (7).

11. The filter sector (1) according to claim 2, wherein the hexagon is formed from six sections (5) with a first section (5) and a second section (5) being mutually opposite sections from each other and formed as saddle surfaces (7), a third section (5) and a fourth section (5) forming a first ridge surface (9), a fifth section (5) and a sixth section (5) forming a second ridge surface (9) mutually opposite from the first ridge surface (9), and the respective ridge surfaces (9) being connected by the saddle surfaces (7).

12. The filter sector (1) according to claim 11, wherein the third, fourth, fifth and sixth sections (5) of the polygonal base (4) lie in a plane and a respective pass (8) of the saddle surface (7) is arranged between the plane and the interior space (13).

13. The filter sector (1) according to claim 10, wherein the third, fourth, fifth and sixth sections (5) of the polygonal base (4) lie in a plane and a respective pass (8) of the saddle surface (7) is arranged between the plane and the interior space (13).

14. The filter sector (1) according to claim 1, wherein the structuring of the filter plate (2) varies at least in sections.

15. The filter sector (1) according to claim 1, wherein the filter sector (1) is shaped as circular sector.

16. The filter sector (1) according to claim 1, wherein the perforated and structured filter plate (2) is an arch structured perforated plate.

17. The filter sector (1) according to claim 1, comprising mutually opposite filter plates (2) arranged on each side of the inner space (13), wherein the filter sector (1) is fastened to the circumference of a hollow shaft (12), and the arch structures (3) of the opposite filter plates (2) are arranged symmetrically with respect to the inner space (13) or arranged offset with respect to one another by half a base (4) in a radial direction with respect to the hollow shaft (12).

18. A disc filter (10) comprising:

a rotating hollow shaft (12) having a circumference;

at least one filter disc (11); and a filter sector (1) comprising:

at least one perforated and structured filter plate (2), and an interior space (13) defined within the filter sector (1), wherein the filter plate (2) is configured to be suctioned via the interior space (13) of the filter sector (1) for separating liquid from a suspension, and the filter plate (2) comprises at least one arch structure (3) with a polygonal base (4), the polygonal base (4) of the arch structure (3) being a hexagon, the filter sector (1) is fastened to the circumference of the hollow shaft (12), the filter (1) are sector (1) is configured to be suctioned via the hollow shaft (12), wherein liquid separated from a suspension can be fed from the interior space (13) of the filter sector (1) to the hollow shaft (12), and each arch structure (3) is formed as a shell over the base, the shell being free of edges.

19. The disc filter (10) according to claim 18, wherein the filter plate (2) comprises a plurality of adjacent arch structures (3), the base (4) of the arch structures (3) is a hexagon, and the filter plate (2) is aligned with the hollow shaft (12) such that a connecting line of respective centers of opposite sections (5) of the base (4) point substantially to the hollow shaft (12).

* * * * *